United States Patent
Lee et al.

(10) Patent No.: US 11,845,324 B2
(45) Date of Patent: Dec. 19, 2023

(54) VARIABLE PRESSURE WEATHERSTRIP ASSEMBLY

(71) Applicants: Hyundai Motor Company, Seoul (KR); Kia Corporation, Seoul (KR)

(72) Inventors: Myung-Hee Lee, Seoul (KR); Hyun-Sung Nam, Seoul (KR); In-Ki Eom, Hwaseong-Si (KR); Dae-Hyun Yoon, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/879,949

(22) Filed: Aug. 3, 2022

(65) Prior Publication Data
US 2023/0158872 A1    May 25, 2023

(30) Foreign Application Priority Data
Nov. 19, 2021  (KR) .......................... 10-2021-0160625

(51) Int. Cl.
*B60J 10/244*    (2016.01)
*B60J 10/86*    (2016.01)

(52) U.S. Cl.
CPC .............. *B60J 10/244* (2016.02); *B60J 10/86* (2016.02)

(58) Field of Classification Search
CPC .......... B60J 10/244; B60J 10/86; B60J 10/50; F16K 17/02; B60Y 2306/09
See application file for complete search history.

(56) References Cited

U.S. PATENT DOCUMENTS

| | | | | |
|---|---|---|---|---|
| 4,761,917 A * | 8/1988 | Knecht | ................ | E06B 7/2318 49/490.1 |
| 4,805,347 A * | 2/1989 | Smith | .................... | B60J 10/244 49/477.1 |
| 5,361,542 A * | 11/1994 | Dettloff | ................. | B60J 10/244 49/490.1 |
| 5,489,104 A * | 2/1996 | Wolff | ....................... | B60J 10/77 277/648 |
| 8,109,042 B2 * | 2/2012 | McKnight | ............... | E05B 81/20 49/506 |
| 10,696,147 B2 * | 6/2020 | Baskar | .................... | B60J 10/244 |
| 2006/0010779 A1 * | 1/2006 | Schlachter | ............. | B60J 10/244 49/477.1 |
| 2021/0347238 A1 * | 11/2021 | Oshima | .................... | B60J 10/86 |

FOREIGN PATENT DOCUMENTS

KR    10-2005-0012627 A    2/2005

* cited by examiner

*Primary Examiner* — Daniel J Troy
*Assistant Examiner* — Susan M. Heschel
(74) *Attorney, Agent, or Firm* — Fox Rothschild LLP

(57) ABSTRACT

In one aspect, a variable pressure weatherstrip assembly according to the present disclosure includes: a weatherstrip including a sealing portion having a closed cross-section therein and configured to seal a portion between a vehicle body and an opening/closing part of a vehicle, and a fixing portion integrated with the sealing portion and fixed to a panel of the vehicle; an air supply device configured to supply pressurized air to the sealing portion; an air line configured to allow the air supply device and the sealing portion to communicate with each other; and one or more control valves installed in the air line, disposed between the sealing portion and the air supply device, and configured to control the air to be supplied to the sealing portion from the air supply device.

14 Claims, 4 Drawing Sheets

VARIABLE PRESSURE WEATHERSTRIP ASSEMBLY

CROSS-REFERENCE TO RELATED APPLICATION

This application claims under 35 U.S.C. § 119(a) the benefit of Korean Patent Application No. 10-2021-0160625, filed on Nov. 19, 2021, the entire contents of which are incorporated herein by reference.

BACKGROUND

Field of the Disclosure

The present disclosure relates to a weatherstrip configured to seal a portion between a vehicle body and an opening/closing part of a vehicle, and more particularly, to a variable pressure weatherstrip assembly configured to prevent foreign substances or noise from being introduced from the outside and to adjust a pressure in the weatherstrip according to situations to make it easy to close a door.

Background

An opening/closing part, such as a door, a trunk lid, a tailgate, and a sunroof of a vehicle, is equipped with a weatherstrip configured to seal a portion between the opening/closing part and a vehicle body of the vehicle. For example, as illustrated in FIG. 1, a weatherstrip 130 is mounted on a door 110 of the vehicle and seals a portion between the door 110 and a vehicle body 120.

The weatherstrip 130 is made of an elastic material such as synthetic rubber.

As illustrated in FIG. 1, the weatherstrip includes: a sealing portion 131 having a closed cross-section and configured to perform a sealing function as the cross-section is deformed; a fixing portion 132 configured to fix the weatherstrip 130 to a door panel 111 of the door 110; and an insert 133 inserted into the fixing portion 132 and configured to provide rigidity so that the fixing portion 132 is not separated from the door panel 111.

When the door 110 is closed, the sealing portion 131 of the weatherstrip 130 seals the portion between the door 110 and the vehicle body 120 as the cross-section of the sealing portion 131 is deformed.

When an internal pressure of the sealing portion 131 is low, various types of noise, such as road surface noise or traveling noise, is introduced when the vehicle travels at a high speed. When the internal pressure of the sealing portion 131 increases to prevent the introduction of noise, a reaction force, which is generated at the time of closing the door 110, makes it difficult to close the door 110.

Because there is a trade-off between the introduction of noise and the difficulty in closing the door due to the internal pressure of the sealing portion 131 of the weatherstrip 130, it is not easy to solve the introduction of noise and the difficulty in closing the door at the same time.

To solve the problems, a through-hole 131a is formed in the sealing portion 131 or a variable cross-section is sometimes applied to a partial section of the weatherstrip 130. However, the above-mentioned problems cannot be completely solved, and quality of the weatherstrip 130 is difficult to consistently maintain.

These problems occur not only in the door 110 of the vehicle but also in the other opening/closing parts, such as the trunk lid, the tailgate, and the sunroof, to which the weatherstrip 130 is applied.

SUMMARY OF THE DISCLOSURE

In one aspect, a variable pressure weatherstrip assembly is provided that preferably is capable of preventing or reducing introduction of noise while a vehicle travels at a high speed and changing a reaction force according to traveling states of the vehicle so that the reaction force is reduced at the time of closing a door.

As a preferred embodiment, a variable pressure weatherstrip assembly comprises: a weatherstrip comprising a sealing portion having a closed cross-section therein and configured to seal a portion between a vehicle body and an opening/closing part of a vehicle, and a fixing portion integrated with the sealing portion and fixed to a panel of the vehicle to the sealing portion; an air supply device configured to supply pressurized air; an air line configured to allow the air supply device and the sealing portion to communicate with each other; and one or more control valves installed in the air line, disposed between the sealing portion and the air supply device, configured to control the air to be supplied to the sealing portion from the air supply device.

The control valve may include: an intake port through which the air is introduced into the control valve from the outside; and an atmospheric pressure port configured to maintain a pressure in the sealing portion so that the pressure in the sealing portion is equal to atmospheric pressure.

The variable pressure weatherstrip assembly may further include: a control unit configured to control the air supply device and the control valve according to a speed of the vehicle or whether the opening/closing part is opened or closed so that a pressure in the sealing portion is within a predetermined pressure range from a preset reference pressure.

When the speed of the vehicle is higher than a predetermined vehicle speed, the control unit may control the air supply device and the control valve so that the pressure in the sealing portion is higher than the reference pressure.

The control unit may operate the air supply device and open a supply port of the control valve to which the air line is connected.

When it is detected that the opening/closing part is being opened or closed, the control unit may control the air supply device and the control valve so that the pressure in the sealing portion is lower than the reference pressure.

The control unit may control and discharge the air in the sealing portion by opening a supply port of the control valve to which the air line is connected and by opening an exhaust port of the control valve through which the air is discharged to the outside.

The variable pressure weatherstrip assembly may further include: a pressure sensor installed at one side of the air line and configured to measure the pressure in the sealing portion and output the pressure in the sealing portion to the control unit.

When the pressure in the sealing portion measured by the pressure sensor is equal to or higher than the predetermined pressure while the air supply device operates, the control unit may stop an operation of the air supply device.

The control valves may include: a first control valve configured to control introduction of air from the outside; a second control valve installed between the first control valve and the air supply device; a third control valve installed to be connected to the air line and configured to control and allow the air line and the atmosphere to communicate with each other; and a fourth control valve installed between the air supply device and the air line.

When the vehicle travels, the control unit may control to supply the air to the sealing portion via the first control valve, the second control valve, the air supply device, and the fourth control valve.

The variable pressure weatherstrip assembly may further include a pressure sensor installed at one side of the air line and configured to measure the pressure in the sealing portion and output the pressure in the sealing portion to the control unit, and when the pressure in the sealing portion reaches the predetermined pressure, the control unit may stop an operation of a pump and close the first control valve, the second control valve, and the fourth control valve.

In a state in which the vehicle is stationary, the control unit may control that the third control valve is opened to maintain the pressure in the sealing portion so that the pressure in the sealing portion is equal to atmospheric pressure.

The control unit may change the reference pressure in the sealing portion when the opening/closing part is changed.

The opening/closing part may be any one of a door, a trunk lid, a sunroof, and a tailgate of the vehicle.

The air supply device may be any one of an air pump, a blower, an air compressor, and an air tank.

According to the variable pressure weatherstrip assembly of the present disclosure configured as described above, the pressure in the sealing portion of the weatherstrip increases when the speed of the vehicle increases and an outside pressure decreases. Therefore, the sealability between the opening/closing part and the vehicle body is improved, and the introduction of outside noise is blocked.

In addition, the pressure in the sealing portion decreases at the time of opening or closing the opening/closing part, thereby improving opening properties and closing properties of the opening/closing part.

In another aspect, a vehicle is provided that comprises a variable pressure weatherstrip assembly as disclosed herein.

Other aspects are disclosed infra.

DESCRIPTION OF SPECIFIC EMBODIMENTS

Figure 1:
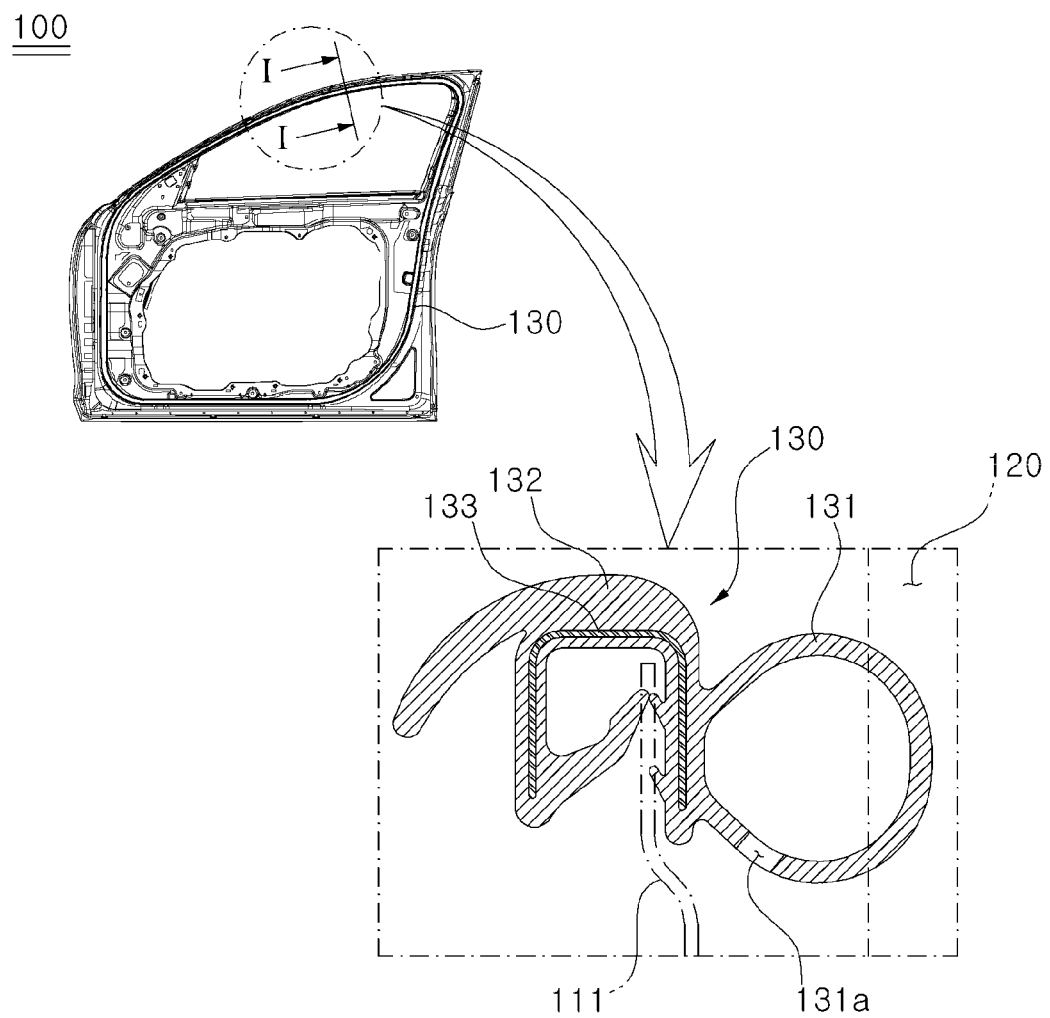
FIG. 1 is a cross-sectional view illustrating a weatherstrip in the related existing technologies.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some exemplary embodiments of the present disclosure will be described in detail with reference to the exemplary accompanying drawings, and since these embodiments, as examples, may be implemented in various different forms by those skilled in the art to which the present disclosure pertains, they are not limited to the embodiments described herein. In the drawings, the same reference numerals will be used throughout to designate the same or equivalent elements. In addition, a detailed description of well-known features or functions will be ruled out in order not to unnecessarily obscure the gist of the present disclosure.

Figure 2:
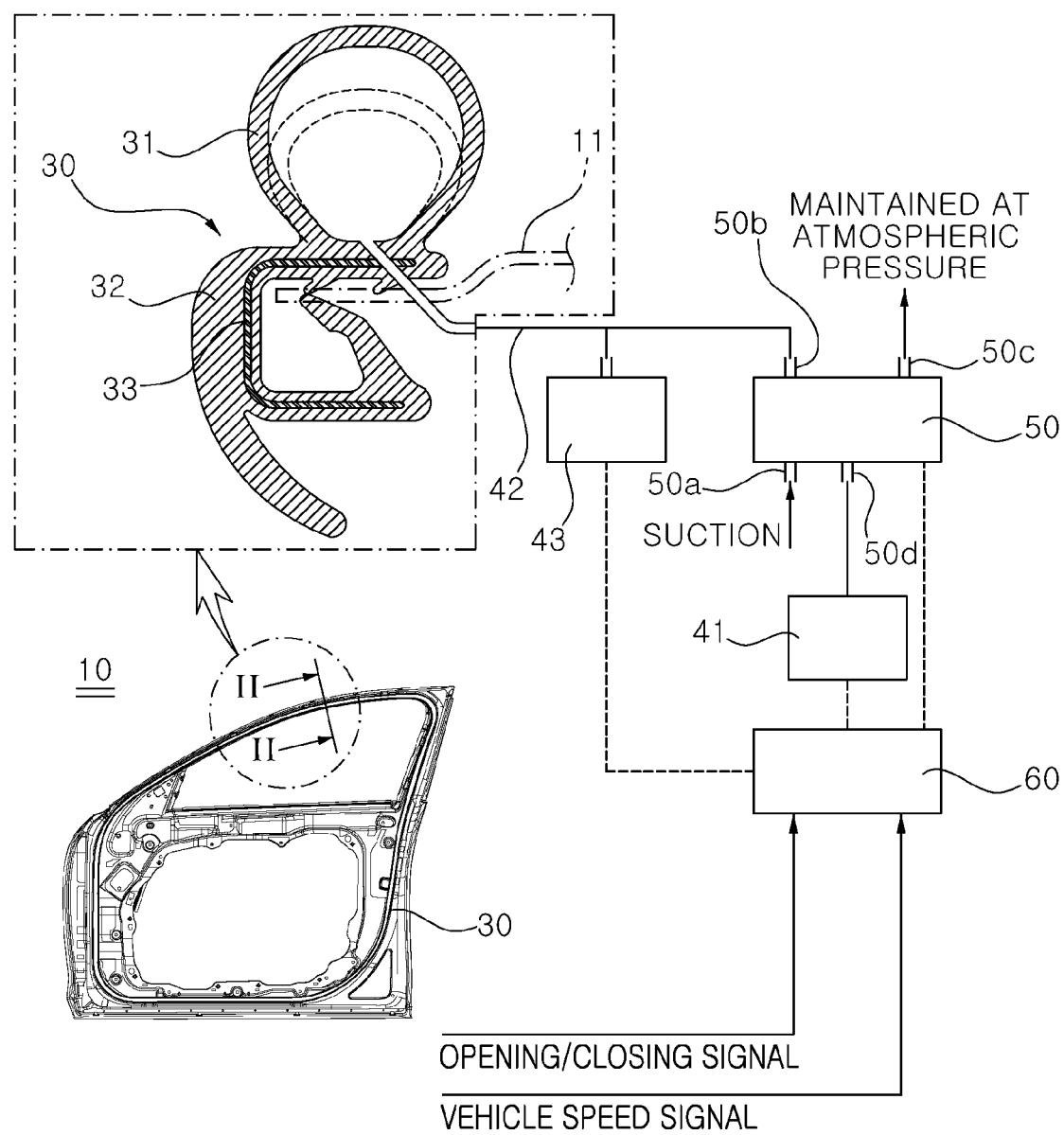
FIG. 2 is a schematic view illustrating a variable pressure weatherstrip assembly according to an exemplary embodiment of the present disclosure.

Hereinafter, a variable pressure weatherstrip assembly according to the present disclosure will be described in detail with reference to the accompanying drawings, FIGS. 2, 3 and 4.

A variable pressure weatherstrip assembly according to the present disclosure includes: a weatherstrip 30 including a sealing portion 31 having a closed cross-section therein and configured to seal a portion between a vehicle body and an opening/closing part 10 of a vehicle, and a fixing portion 32 integrated with the sealing portion 31 and fixed to a panel of the vehicle; an air supply device 41 configured to supply pressurized air; an air line 42 configured to allow the air supply device 41 and the sealing portion 31 to communicate with each other; and one or more control valves 50 installed in the air line 42, disposed between the sealing portion 31 and the air supply device 41, and configured to control the air to be supplied to the sealing portion 31 from the air supply device 41.

The weatherstrip 30 is mounted on an opening/closing part of the vehicle. The opening/closing part of the vehicle may be a door, a trunk lid, a tailgate, a sunroof, or the like. Hereinafter, an example will be described in which the weatherstrip 30 is mounted on the door 10 of the vehicle.

The weatherstrip 30 includes: the sealing portion 31 having a hollow cross-section; the fixing portion 32 integrated with the sealing portion 31 and fixed to a panel 11 of the door; and an insert 33 inserted into the fixing portion 32 and configured to maintain a state in which the fixing portion 32 is fixed to the panel 11. The sealing portion 31 and the fixing portion 32 are made of synthetic rubber, and the insert 33 is made of metal.

The sealing portion 31 has a closed cross-section which is hollow therein. When the door 10 is closed, the sealing portion 31 seals the portion between the door 10 and the vehicle body 20.

The fixing portion 32 is made of the same material as the sealing portion 31 and connected to the sealing portion 31. The fixing portion 32 serves to hold the panel of the door.

The insert 33 is inserted into the fixing portion 32 and allows the fixing portion 32 to have rigidity when the fixing portion 32 holds the panel.

The air supply device 41 supplies air to the sealing portion 31 when electric power is applied to the air supply device 41. The air discharged from the air supply device 41 is supplied to the sealing portion 31, for increasing a pressure in the sealing portion 31. When a speed of the vehicle is high, a pressure in the weatherstrip 30, i.e., the pressure in the sealing portion 31 increases to prevent introduction of outside noise. The air supply device 41 discharges the compressed air and supplies the compressed air to the sealing portion 31 to increase the pressure in the sealing portion 31, thereby improving sealability between the door 10 and the vehicle body.

The air supply device 41 may be an air pump for pressurizing and discharging air, a blower for supplying and discharging air at a high speed, an air compressor for compressing air, an air tank for storing pressurized air therein, or the like. Hereinafter, an example will be described in which the air pump 41 is applied as the air supply device 41, but the air supply device 41 is not limited to the air pump 41.

The air line 42 connects the air supply device 41 and the sealing portion 31. The compressed air discharged from the air supply device 41 is supplied to the sealing portion 31 through the air line 42.

The control valve 50 is installed between the air supply device 41 and the sealing portion 31 and controls the air to be supplied to the sealing portion 31 from the air supply device 41 or to be blocked between the sealing portion 31 and the air supply device 41.

Furthermore, the control valve 50 may operate to discharge the air in the sealing portion 31.

The control valve 50 has a plurality of ports to supply the compressed air to the sealing portion 31 or discharge the air in the sealing portion 31. The ports of the control valve 50 include: an intake port 50a through which air is introduced from the outside; a supply port 50b through which compressed air is supplied to the sealing portion 31; an atmospheric pressure port 50c configured to maintain the pressure in the sealing portion 31 so that the pressure in the sealing portion 31 is equal to an atmospheric pressure; and an inlet port 50d through which the compressed air is introduced from the air supply device 41. The ports are opened or closed according to a control signal from a control unit 60 to be described below.

The pressure sensor 43 measures the pressure in the sealing portion 31. The pressure sensor 43 is disposed at one side of the air line 42, measures the pressure in the sealing portion 31, and outputs the measured pressure in the sealing portion 31.

According to the situations, the control unit 60 operates the air supply device 41 or controls the control valve 50 to open or close the respective ports of the control valve 50.

The control unit 60 receives an opening and closing signal for the door and a vehicle speed of the vehicle from the outside and controls the pressure in the sealing portion 31 according to the states of the door or the vehicle. To open or close the door, a driver or a passenger operates a door lock, or a signal such as a signal of an ajar switch for detecting whether the door is opened or closed is inputted, such that whether the door 10 is opened or closed is detected. Further, the vehicle speed is inputted to the control unit 60 so that the control unit 60 adjusts the internal pressure of the sealing portion 31 on the basis of the vehicle speed.

Furthermore, the pressure in the sealing portion 31, which is measured by the pressure sensor 43, is also inputted to the control unit 60.

An operation of the variable pressure weatherstrip assembly according to the present disclosure configured as described above will be described below.

When the opening/closing part, i.e., the door 10 is opened and an opening signal for the door 10 is inputted to the control unit 60, the control unit 60 controls the control valve 50 so that the atmospheric pressure port 50c of the control valve 50 is opened. When the atmospheric pressure port 50c of the control valve 50 is opened, the pressure in the sealing portion 31 becomes equal to the atmospheric pressure, and the opening properties of the door are improved.

The weatherstrip 30 is installed in the door 10 is in a compressed state while the door 10 is closed, and the pressure in the sealing portion 31 is higher than the atmospheric pressure. However, when the atmospheric pressure port 50c is opened before the door 10 is properly opened (at the moment when the opening of the door is detected), a part of the air in the sealing portion 31 is discharged into the atmosphere, and the pressure in the sealing portion 31 becomes equal to the atmospheric pressure, such that the opening properties are improved.

When the door 10 is closed and the door is completely closed, the air supply device 41 operates to supply the air to the sealing portion 31. When a signal indicating that the door is completely closed is inputted to the control unit 60, the control unit 60 closes the atmospheric pressure port 50c and opens the intake port 50a, the supply port 50b, and the inlet port 50d. Further, the control unit 60 operates the air supply device 41. Since the air supply device 41 operates in the state in which the sealing portion 31 communicates with the air supply device 41 through the control valve 50, the air discharged from the air supply device 41 is supplied to the sealing portion 31 to increase the internal pressure of the sealing portion 31. When the pressure in the sealing portion 31 increases, the sealability of the weatherstrip 30 between the door 10 and the vehicle body is improved.

The operation of the air supply device 41 is stopped when the pressure in the sealing portion 31 measured by the pressure sensor 43 is equal to or higher than a predetermined pressure while the air supply device 41 operates.

Meanwhile, the control unit 60 compares the vehicle speed of the vehicle with a preset reference speed. Even when the current speed of the vehicle is equal to or higher than the reference vehicle speed, the control unit 60 operates the air supply device 41 in the state in which the atmospheric pressure port 50c is closed and the intake port 50a, the supply port 50b, and the inlet port 50d are opened, thereby increasing the pressure in the sealing portion 31. When the pressure in the sealing portion 31 is equal to or higher than the predetermined pressure even in this case, the operation of the air supply device 41 is stopped.

The operations of the air supply device 41 and the control valve 50 at the time of opening or closing the door 10 are also applied to the case in which the trunk lid, the tailgate, the sunroof, and the like are opened or closed.

Figure 3:
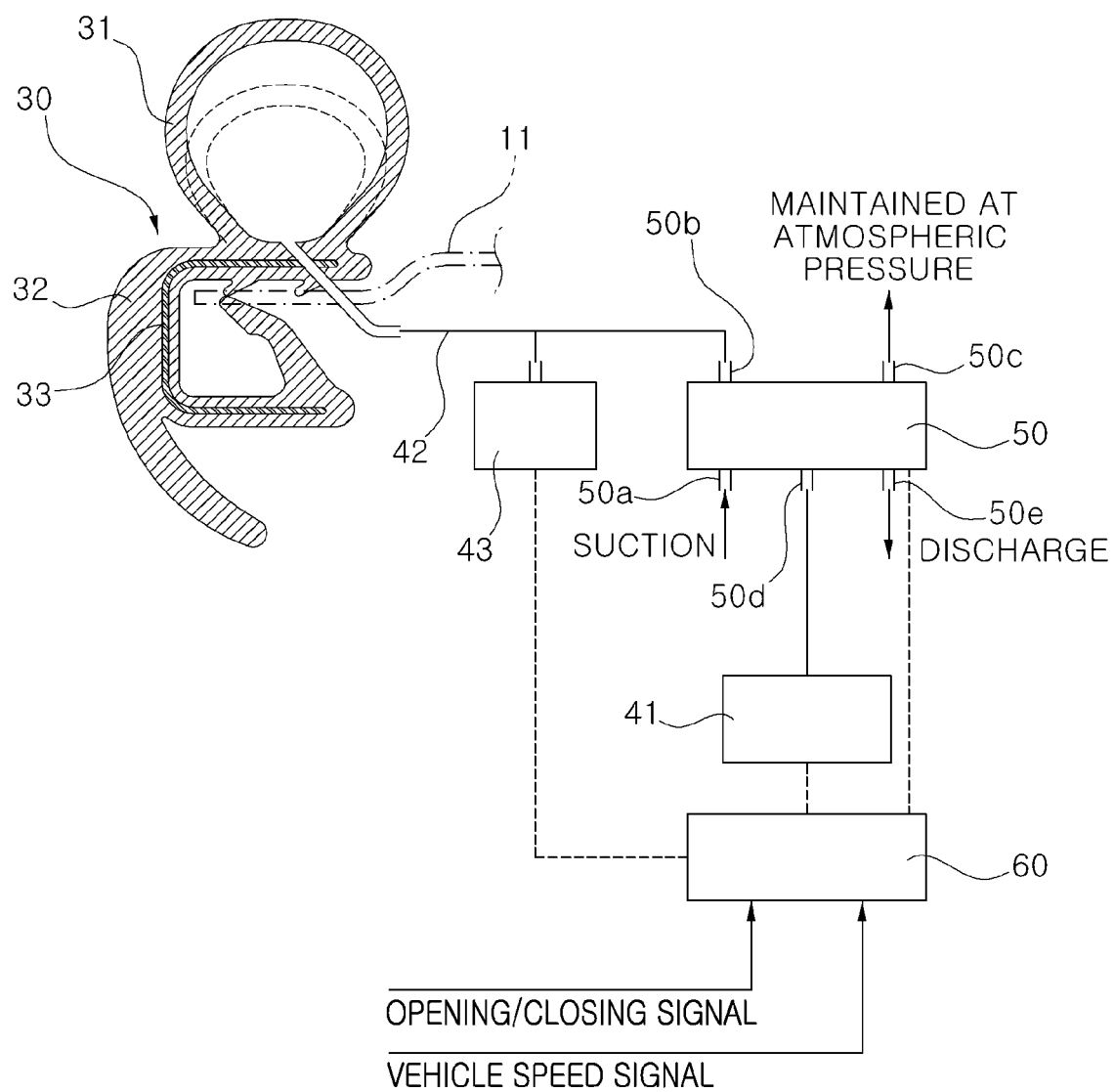
FIG. 3 is a schematic view illustrating a variable pressure weatherstrip assembly according to another exemplary embodiment of the present disclosure.

FIG. 3 illustrates another exemplary embodiment of the variable pressure weatherstrip assembly according to the present disclosure.

In the present embodiment, the control valve 50 additionally has an exhaust port 50e for discharging the air in the sealing portion 31 to the outside. The other configurations are identical to those in the above-mentioned embodiment.

An operation of the variable pressure weatherstrip assembly according to the present embodiment will be described below.

At the time of closing the door in the state in which the door is opened, the door is not sometimes completely closed because of the reaction force of the weatherstrip 30, i.e., the reaction force of the sealing portion 31. To solve the problem, the air in the sealing portion 31 is forcibly discharged in advance to decrease the reaction force of the sealing portion 31, which makes it easy to close the door.

When the opening signal for the door is inputted to the control unit 60, the control unit 60 opens the supply port 50b, the inlet port 50d, and the exhaust port 50e and operates the air supply device 41 so that the air is discharged to the outside through the exhaust port 50e.

In this case, when the pressure in the sealing portion 31, which is outputted from the pressure sensor 43, is equal to or lower than a pressure lower than the atmospheric pressure, the control unit 60 maintains the state in which the pressure in the sealing portion 31 is decreased. That is, the control unit stops the operation of the air supply device 41 and closes the supply port 50b, the inlet port 50d, and the exhaust port 50e, thereby maintaining the state in which the reaction force of the sealing portion 31 is decreased.

In the state in which the reaction force of the sealing portion 31 is decreased, the door may be completely closed even though the door is closed by a small amount of force. When the door 10 is completely closed, the control unit opens the atmospheric pressure port 50c to maintain the pressure in the sealing portion 31 so that the pressure in the sealing portion 31 is equal to the atmospheric pressure.

Meanwhile, in a case in which the vehicle travels at a high speed, a pressure outside the vehicle is decreased, and the reaction force of the sealing portion 31 is decreased, which causes introduction of noise into the interior of the vehicle and generates vibration of the door. To solve the problem, when the vehicle speed of the vehicle is equal to or higher than the predetermined vehicle speed, the control unit opens the intake port 50a, the supply port 50b, and the inlet port 50d and operates the air supply device 41. The air is supplied from the air supply device 41 to the sealing portion 31, such that the reaction force of the sealing portion 31 is increased. When the reaction force of the sealing portion 31 is increased, the introduction of outside noise is blocked and the vibration of the door is inhibited while the vehicle travels at a high speed.

Further, when the speed of the vehicle is lower than the predetermined vehicle speed, the atmospheric pressure port 50c is opened so that the pressure in the sealing portion 31 is equal to the atmospheric pressure. The reason is that the opening properties of the door 10 deteriorate when the pressure in the sealing portion 31 is high.

Figure 4:
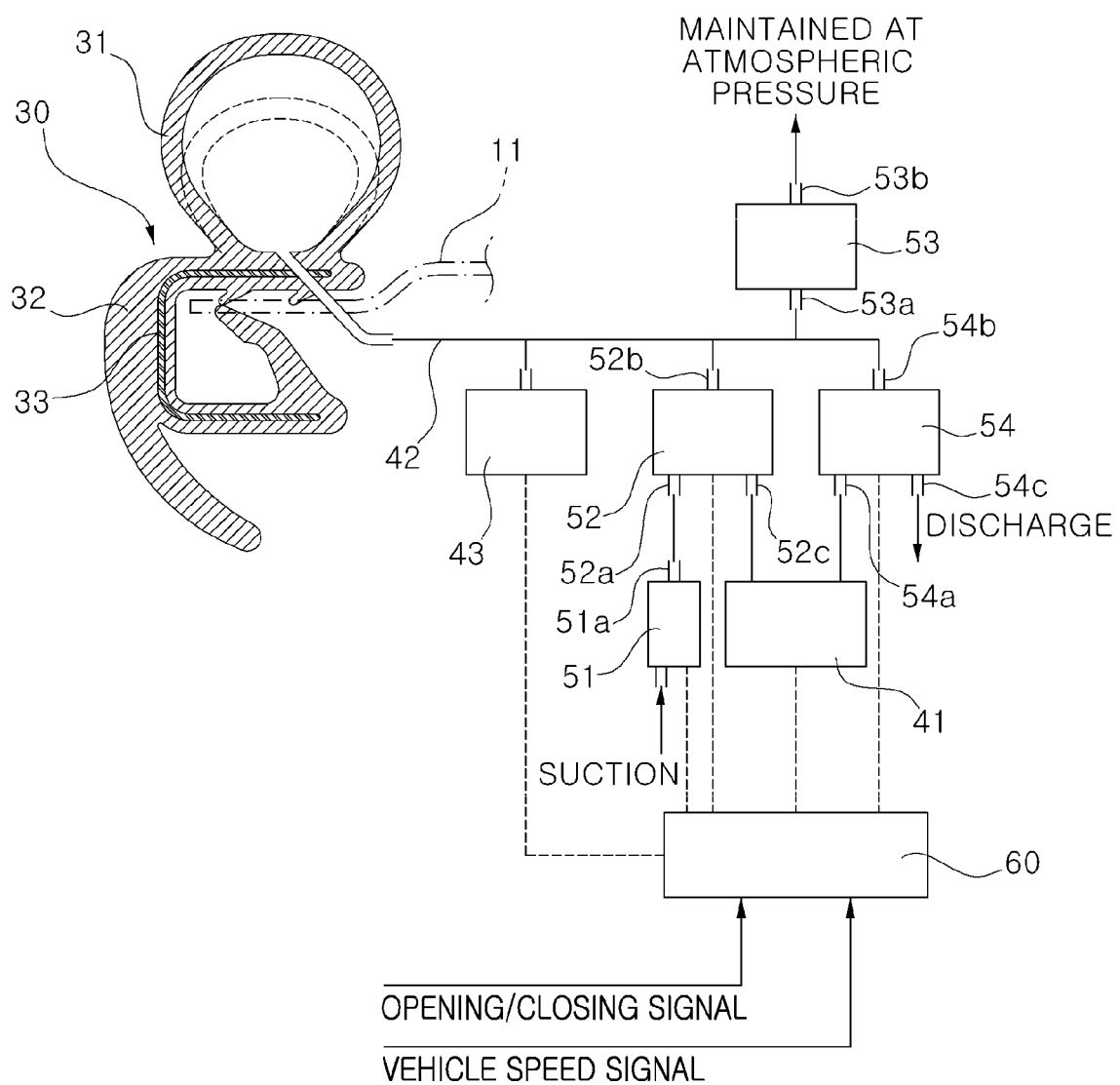
FIG. 4 is a schematic view illustrating a variable pressure weatherstrip assembly according to still another exemplary embodiment of the present disclosure.

FIG. 4 illustrates still another exemplary embodiment of the variable pressure weatherstrip assembly according to the present disclosure.

In the present embodiment, a plurality of control valves is provided, unlike the above-mentioned embodiments.

A first control valve 51 controls introduction of air from the outside.

A second control valve 52 is connected to the first control valve 51 and the air supply device 41. The second control valve 52 receives the air discharged from the first control valve 51 and supplies the air to the air supply device 41. In addition, the second control valve 52 communicates with the sealing portion 31 of the weatherstrip 30 through the air line 42.

A third control valve 53 is connected to the air line 42 and configured to close the air line 42 or allow the air line 42 to communicate with the atmosphere.

A fourth control valve 54 is installed between the air line 42 and the air supply device 41. The fourth control valve 54 supplies the air, which is discharged from the air supply device 41, to the air line 42 or blocks the supply of air. An exhaust port 54c is provided at one side of the fourth control valve 54, and the air is discharged from the fourth control valve 54 to the outside through the exhaust port 54c.

An operation of the variable pressure weatherstrip assembly according to the present embodiment configured as described above will be described.

The ports are opened while the vehicle travels so that the first control valve 51 and the second control valve 52 communicate with each other, the second control valve 52 and the air supply device 41 communicate with each other, the air supply device 41 and the fourth control valve 54 communicate with each other, and the fourth control valve 54 and the air line 42 communicate with each other. All the other ports 52b, 53a, 53b, and 54c of the first to fourth control valves 51, 52, 53, and 54 are closed.

The air supply device 41 operates to pressurize the air supplied to the air supply device 41 through the first and second control valves 51 and 52 and supplies the air to the sealing portion 31 through the fourth control valve 54 and the air line 42. When the air is supplied to the sealing portion 31, the pressure in the sealing portion 31 increases, and the reaction force increases, such that the sealability between the door 10 and the vehicle body is improved. Therefore, the introduction of outside noise is blocked.

In this case, when the pressure in the sealing portion 31 measured by the pressure sensor 43 reaches the preset pressure, the operation of the air supply device 41 is stopped, and the opened ports 51a, 52a, 52c, 54a, and 54b are closed to close the first control valve 51, the second control valve 52, and the fourth control valve 54.

In a state in which the vehicle is stationary, the port 53a for allowing the air line 42 and the third control valve 53 to communicate with each other is opened, and the port 53b for allowing the third control valve 53 and the atmosphere to communicate with each other is opened, such that the pressure in the sealing portion 31 is maintained to be equal to the atmospheric pressure.

When the door is opened or closed, i.e., when whether the door is opened or closed is detected, the air in the sealing portion 31 is discharged, and the pressure in the sealing portion 31 is maintained to be lower than the atmospheric pressure. To this end, the exhaust port 54c of the fourth control valve 54 is opened so that the air line 42 and the second control valve 52 communicate with each other, the second control valve 52 and the air supply device 41 communicate with each other, and the air supply device 41 and the fourth control valve 54 communicate with each other. Further, when the air supply device 41 operates, the air in the sealing portion 31 is discharged to the outside via the air line 42, the second control valve 52, the air supply device 41, and the fourth control valve 54. Since the air in the sealing portion 31 is forcibly discharged to the outside as described above, the pressure in the sealing portion 31 becomes lower than the atmospheric pressure, and the reaction force decreases, which makes it easy to open or close the door. After the door 10 is completely opened or closed, the third control valve 53 is opened, and the sealing portion 31 is restored to the atmospheric pressure state, thereby maintaining the appropriate sealing performance.

What is claimed is:

1. A variable pressure weatherstrip assembly comprising:
   a weatherstrip comprising a sealing portion having a closed cross-section therein and configured to seal a portion between a vehicle body and an opening/closing part of a vehicle, and a fixing portion integrated with the sealing portion and fixed to a panel of the vehicle;
   an air supply device configured to supply pressurized air to the sealing portion;
   an air line configured to allow the air supply device and the sealing portion to communicate with each other;
   one or more control valves installed in the air line, disposed between the sealing portion and the air supply device, configured to control the air to be supplied to the sealing portion from the air supply device;
   a control unit configured to control the air supply device and the one or more control valves according to a speed of the vehicle or whether the opening/closing part is opened or closed so that a pressure in the sealing portion is within a predetermined pressure range from a preset reference pressure,
   wherein the one or more control valves comprise:
      a first control valve configured to control introduction of air from the outside;
      a second control valve installed between the first control valve and the air supply device;
      a third control valve installed to be connected to the air line and configured to control and allow the air line and the atmosphere to communicate with each other; and
      a fourth control valve installed between the air supply device and the air line.

2. The variable pressure weatherstrip assembly of claim 1, wherein the one or more control valves comprise:
   an intake port through which the air is introduced into the one or more control valves from the outside; and
   an atmospheric pressure port configured to maintain a pressure in the sealing portion so that the pressure in the sealing portion is equal to atmospheric pressure.

3. The variable pressure weatherstrip assembly of claim 1, wherein when the speed of the vehicle is equal to or higher than a predetermined vehicle speed, the control unit controls the air supply device and the one or more control valves so that the pressure in the sealing portion is higher than the reference pressure.

4. The variable pressure weatherstrip assembly of claim 3, wherein the control unit operates the air supply device and opens a supply port of the one or more control valves to which the air line is connected.

5. The variable pressure weatherstrip assembly of claim 1, wherein when it is detected that the opening/closing part is being opened or closed, the control unit controls the air supply device and the one or more control valves so that the pressure in the sealing portion is lower than the reference pressure.

6. The variable pressure weatherstrip assembly of claim 5, wherein the control unit controls and discharges the air in the sealing portion by opening a supply port of the one or more control valves to which the air line is connected and by opening an exhaust port of the one or more control valves through which the air is discharged to the outside.

7. The variable pressure weatherstrip assembly of claim 1, further comprising:
   a pressure sensor installed at one side of the air line and configured to measure the pressure in the sealing portion and output the pressure in the sealing portion to the control unit.

8. The variable pressure weatherstrip assembly of claim 7, wherein when the pressure in the sealing portion measured by the pressure sensor is equal to or higher than the predetermined pressure while the air supply device operates, the control unit stops an operation of the air supply device.

9. The variable pressure weatherstrip assembly of claim 1, wherein when the vehicle travels, the control unit controls to supply the air to the sealing portion via the first control valve, the second control valve, the air supply device, and the fourth control valve.

10. The variable pressure weatherstrip assembly of claim 9, further comprising:
    a pressure sensor installed at one side of the air line and configured to measure the pressure in the sealing portion and output the pressure in the sealing portion to the control unit,
    wherein when the pressure in the sealing portion reaches the predetermined pressure, the control unit stops an operation of a pump and closes the first control valve, the second control valve, and the fourth control valve.

11. The variable pressure weatherstrip assembly of claim 1, wherein in a state in which the vehicle is stationary, the control unit controls that the third control valve is opened to maintain the pressure in the sealing portion so that the pressure in the sealing portion is equal to atmospheric pressure.

12. The variable pressure weatherstrip assembly of claim 3, wherein the opening/closing part is any one of a door, a trunk lid, a sunroof, or a tailgate of the vehicle, and the control unit changes the reference pressure in the sealing portion according to the door, the trunk lid, the sunroof, or the tailgate of the vehicle.

13. The variable pressure weatherstrip assembly of claim 1, wherein the air supply device is any one of an air pump, a blower, an air compressor, and an air tank.

14. A vehicle that comprises a variable pressure weather strip assembly of claim 1.

* * * * *